Patented Aug. 16, 1932

1,872,263

UNITED STATES PATENT OFFICE

WILSON EVANS, OF CHICAGO, ILLINOIS, ASSIGNOR TO NATIONAL ALUMINATE CORPORATION, OF CHICAGO, ILLINOIS, A CORPORATION OF DELAWARE

PROCESS OF TREATING LIQUIDS

No Drawing.   Application filed June 11, 1928.   Serial No. 284,658.

My invention relates to improvements in processes of treating water and is primarily adapted for the treatment of water in softening plants adapted to prepare it for commercial purposes particularly for use in boilers. I propose to use in connection with any ordinary water softening or treating mixture a reagent which will expedite and cause to progress nearer to completion the process carried on by the softening or treating mixture and to some extent by the additional reagent itself, and which will coagulate or flocculate the resultant precipitate so as to carry down and settle out such precipitate and any other matter which may be in suspension, thus rendering settling or filtration easier and more rapid and positive. I propose to mix this additional reagent or catalyst with the water after the introduction of the other treating elements which are used in connection with it.

The reagent or catalyst which I propose to use is barium aluminate, which may be obtained in any desired manner and may appear either in solution or in the dry form as the case may be, depending upon the process of manufacture of the barium aluminate.

My process is preferably carried on in connection with water softening or treating by the lime, soda ash process. The purpose of such treatment independent of my invention is to remove from the water the dissolved calcium and magnesium salts present largely in the form of bi-carbonates, carbonates and sulphates. The lime is used to convert the soluble calcium bi-carbonate into the corresponding insoluble carbonate and also to convert the soluble magnesium bicarbonate into the corresponding partially soluble magnesium carbonate, which latter is reacted upon by a further amount of lime to form the insoluble magnesium hydroxide, such action being expedited and carried further toward completion by my treatment. The soda ash converts the calcium sulphate into the corresponding insoluble carbonate and converts the magnesium sulphate into the partially soluble magnesium carbonate, which is, in turn, acted upon by the lime used in the treatment and converted into the insoluble magnesium hydroxide, such action being expedited and carried further toward completion by my treatment. Experience shows that, particularly when water is treated cold with lime and soda ash only, the reactions above indicated, especially so far as the formation of the insoluble magnesium hydroxide is concerned, progresses very slowly and only to a partial extent, and in order to secure reasonably complete elimination of the dissolved calcium and magnesium salts it is necessary to employ a considerable excess amount of soda ash and lime. Not only do the reactions as outlined in cold water progress slowly and incompletely but the precipitates formed when lime and soda ash only are used for treatment are very fine and settle slowly and, when filtration is used, water so treated filters with difficulty, resulting sometimes in cloudy effluent especially at high rates of filtration. Moreover, even when the visible precipitates have been settled or filtered and the water is crystal clear, there is an after-reaction which results in the very gradual though long continued formation of precipitates, which are deposited on the grains of sand or silica used as a filtering medium, or on the pipes through which the water flows, causing the individual grains to grow, or the pipes to be gradually clogged. If the crystal clear water which has been treated by the lime, soda ash process is introduced into a boiler or otherwise heated, the after-reaction is greatly speeded up with the formation of further precipitates in relatively large quantities, causing foaming and scale formation, and this difficulty is increased if, in the effort to insure complete reaction, an increased amount of the softening reagents has been used.

It is to avoid the difficulties above referred to that I have developed my process. Many tests have been made showing complete elimination of excess reagents with water carried down to a lower point in hardness.

Experience shows that at temperatures as low as 34° F. good results can be obtained with barium aluminate, while the results obtained without it become increasingly worse as the temperature falls. Due to the lower hardness obtained and the smaller excess of reagents in the treated water, this water was rendered much more suitable for the purposes for which it was treated. The after-reaction above referred to is done away with and the precipitates are much larger and are coagulated so as to settle rapidly and also carry down with them at a rapid rate any foreign matter which may be suspended in the water.

My process is carried out by introducing into the water which has previously been mixed or treated with lime and soda ash or with either alone a suitable quantity of barium aluminate. When this is done rapid precipitation and coagulation takes place and the precipitate settles down in a flocculent form, carrying with it, as above indicated, the organic or other matter which may be in suspension in the water. The water and the precipitates are then separated in any suitable way as by drawing off the clear, supernatant water, and, if desired, by filtering, although this is not ordinarily necessary with my process on account of the greatly improved settling secured by it. The resultant clarified, purified, softened water will then be fed directly into the boiler and can be heated without bringing down any appreciable amount of further precipitate.

With reference to the claims it must be emphasized that by the use of the term barium aluminate I do not wish to be limited to chemically pure barium aluminate, although the active ingredient in any dry mixture or solution containing barium aluminate is its barium aluminate content.

The barium aluminate has what may be termed a catalytic effect; at least it is an effect somewhat analogous to a catalytic effect because it speeds up or reinforces and makes more positive the softening action of the lime and soda ash softening compounds, or of any other softening compounds used in the water. It may be used in such quantities as not at all to be sufficient by itself for water softening. It may be used in such quantities that the total quantity of it with other compounds would, if the activity of the barium aluminate were only that normally to be expected, be quite inadequate for satisfactory water softening; but when combined with the other water softening compounds it has an expediting or speeding up effect, reinforcing and furthering the action of the ordinary water treating compounds and resulting in an increased precipitation and coagulation.

When water containing calcium and magnesium salts or water containing either a calcium or a magnesium salt is treated with barium aluminate and any standard water treating compound, either calcium or magnesium aluminates or both are formed. Either of these substances are very effective as a coagulant and their presence in the water results in the quick flocculation of the precipitates brought down by the water softening compound. The formation of the magnesium aluminates is illustrated by the following formulæ; calcium aluminate being formed in a similar manner.

$$MgSO_4 + BaAl_2O_4 = MgAl_2O_4 + BaSO_4$$

(Magnesium sulphate plus barium aluminate = magnesium aluminate plus barium sulphate.)

$$Mg(HCO_3)_2 + BaAl_2O_4 = MgAl_2O_4 + BaCO_3 + CO_2 + H_2O$$

(Magnesium bicarbonate plus barium aluminate = magnesium aluminate plus barium carbonate plus carbon-dioxide plus water.)

Further reactions in carrying out the softening process are:

$$BaCO_3 + Na_2SO_4 = Na_2CO_3 + BaSO_4$$

(Barium carbonate plus sodium sulphate = sodium carbonate plus barium sulphate.)

The sodium carbonate formed as above then reacts with any calcium or magnesium sulphates present in the water, thus replacing the equivalent amount of soda ash otherwise required in carrying out the softening process.

It will be especially noticed from the above equations that the barium aluminate treatment results in the removal as the insoluble barium sulphate of an equivalent amount of sulphate contained in the original water or present due to the softening reactions.

In the above equations we have expressed barium aluminate in the mono-barium form only, whereas our experimental work has included with equal success other forms such as tri-barium aluminate ($3BaO.Al_2O_3$) and it should be understood that the claims include all forms of barium aluminate.

The coagulants, that is to say calcium or magnesium aluminates, formed by the use of barium aluminate differ widely not only in their composition but also in their effect from those coagulants formed by the use of other aluminum compounds, for example aluminum sulphate or alum. When aluminum sulphate is used, aluminum hydrate is formed, and this coagulant from a practical point of view is unsatisfactory not only because of its lack of effectiveness as compared with the calcium and magnesium aluminates but also because it is water soluble except within a comparatively narrow range of hydrogen ion concentrations, which range is normally outside of the range in which most commercial water softening takes place, whereas calcium and magnesium aluminates are insoluble through a wide range of hydrogen ion concentrations including the range in which most commercial water softening takes place. This is particularly true of magnesium aluminate and where magnesium is present in the water being treated this compound is instantly formed due to the fundamental law of chemical reaction to the effect that in a mixture of compounds which may react one upon another the most insoluble compound will be formed. Therefore by the use of barium aluminate in connection with any magnesium carrying water, there is obtained a coagulant effective through an extremely wide range of hydrogen ion concentration the presence of which results in quick settling of the precipitants brought down by the water softening compound and due to breaking down the semicolloida and complex compounds contained in the water. The reaction with the water softening compound is carried to completion rapidly so that there is no after-reaction progressing in the treated water, which after-reaction would otherwise continue for a considerable period of time, resulting in the incrustation of pipe lines through which the water is transmitted or vessels in which it is stored.

For some purposes and with some waters, it is not necessary or desirable to use soda ash. Soda ash is frequently not used where it is unnecessary to obtain the lowest possible hardness of the treated water and the expense of treating with soda ash is considered unjustified. Further some waters already contain an amount of sodium bicarbonate and with these waters the addition of soda ash (sodium carbonate) is manifestly unnecessary. In such cases, the use of lime and barium aluminate alone, although not ordinarily producing a water of low hardness as where lime, soda ash and barium aluminate are used, still produces a satisfactory result in that the barium aluminate insures the practical completion of the lime reactions. If lime alone or, as in some cases, lime and aluminum sulphate or alum is used, the reactions do not progress as rapidly or as near to absolute completion as with the lime and barium aluminate nor is such rapid settling obtained, and the difficulties resulting from after-reaction are present.

Where I have used the language softening compound I do not use that language in the popular sense as referring to any particular patented or selected compound but use the term in the sense of any softening chemical compound or material and of course there may be more than one chemical or more than one compound used in the same process and in the same water at the same time with the barium aluminate.

It will be noted that while preferably under any ordinary conditions the precipitate formed by the treatment is removed from the water, nevertheless under some conditions the precipitate is not removed but allowed to remain in the water as when the compounds and reagents which I propose are used in connection with internal treatment of boiler water which conditions the precipitates are not separated but may go along with the boiler.

I claim:

1. The process of softening water which consists in adding thereto lime and soda ash and then separately adding thereto barium aluminate in such proportions and quantities that the amount of barium aluminate is insufficient to effect any adequate softening by itself but is sufficient to expedite and insure adequate softening by the other ingredients.

2. The process of softening water which consists in adding thereto a softening compound and then separately adding thereto barium aluminate in such proportions and quantities that the amount of barium aluminate is insufficient to effect any adequate softening by itself but is sufficient to expedite and insure adequate softening by the other ingredients.

3. The process of softening water which consists in mixing in solution lime and soda ash, mixing the resultant product with the water to be softened and then adding barium aluminate in such proportions and quantities with respect to the lime and soda ash that the barium aluminate by itself is insufficient to effect any adequate softening but is sufficient to expedite and insure adequate softening action by the other ingredients.

4. The process of softening water which consists in adding thereto a softening compound adapted to react on the water to precipitate out insoluble salts and then adding to the water thus treated barium aluminate in such proportions and quantities that the amount of barium aluminate by itself is insufficient to effect any adequate softening but is sufficient to expedite and insure adequate softening by the other ingredients.

Signed at Chicago county of Cook and State of Illinois, this 31st day of May 1928.

WILSON EVANS.